United States Patent [19]

Levy

[11] 4,215,497
[45] Aug. 5, 1980

[54] TAG

[76] Inventor: John C. Levy, 234 Hoover St., Oceanside, Calif. 92054

[21] Appl. No.: 931,183

[22] Filed: Aug. 4, 1978

[51] Int. Cl.² .............................................. G09F 03/03
[52] U.S. Cl. ................... 40/10 R; 40/2 R; 40/10 D; 40/17; 40/300; D11/103
[58] Field of Search ............... 40/2 A, 2 R, 300, 330, 40/10 D, 17, , 18, 2.2, 586, 10 R; 63/18, 23; D11/80, 103; 350/97, 98, 99; 119/109, 156

[56] References Cited

U.S. PATENT DOCUMENTS

| 1,137,088 | 4/1915 | Rosten et al. | 63/23 |
| 1,362,384 | 12/1920 | Benjamin et al. | 63/18 |
| 2,155,342 | 4/1939 | Wolf | 350/98 |
| 2,451,913 | 10/1948 | Brice | 40/1.5 |
| 2,928,195 | 3/1960 | Fischer | 40/17 |
| 3,209,479 | 10/1965 | Manzardo | 40/2 A |
| 3,409,523 | 10/1968 | Winston | 40/1.5 |

Primary Examiner—John F. Pitrelli
Assistant Examiner—G. Lee Skillington
Attorney, Agent, or Firm—Duane C. Bowen

[57] ABSTRACT

Heart-shaped tag formed by a pair of translucent, reddish plastic pieces having flanges secured together. One plastic piece has retroreflective facets and the other is transparent. An identification member sandwiched between the plastic pieces so that material thereon can be read through the transparent piece. The identification member being installed through a slot in the plastic pieces and snapping into locked position. The identification member having a portion extending out of the slot and an opening in that portion for securing to another object to tag the same.

1 Claim, 5 Drawing Figures

U.S. Patent  Aug. 5, 1980  4,215,497
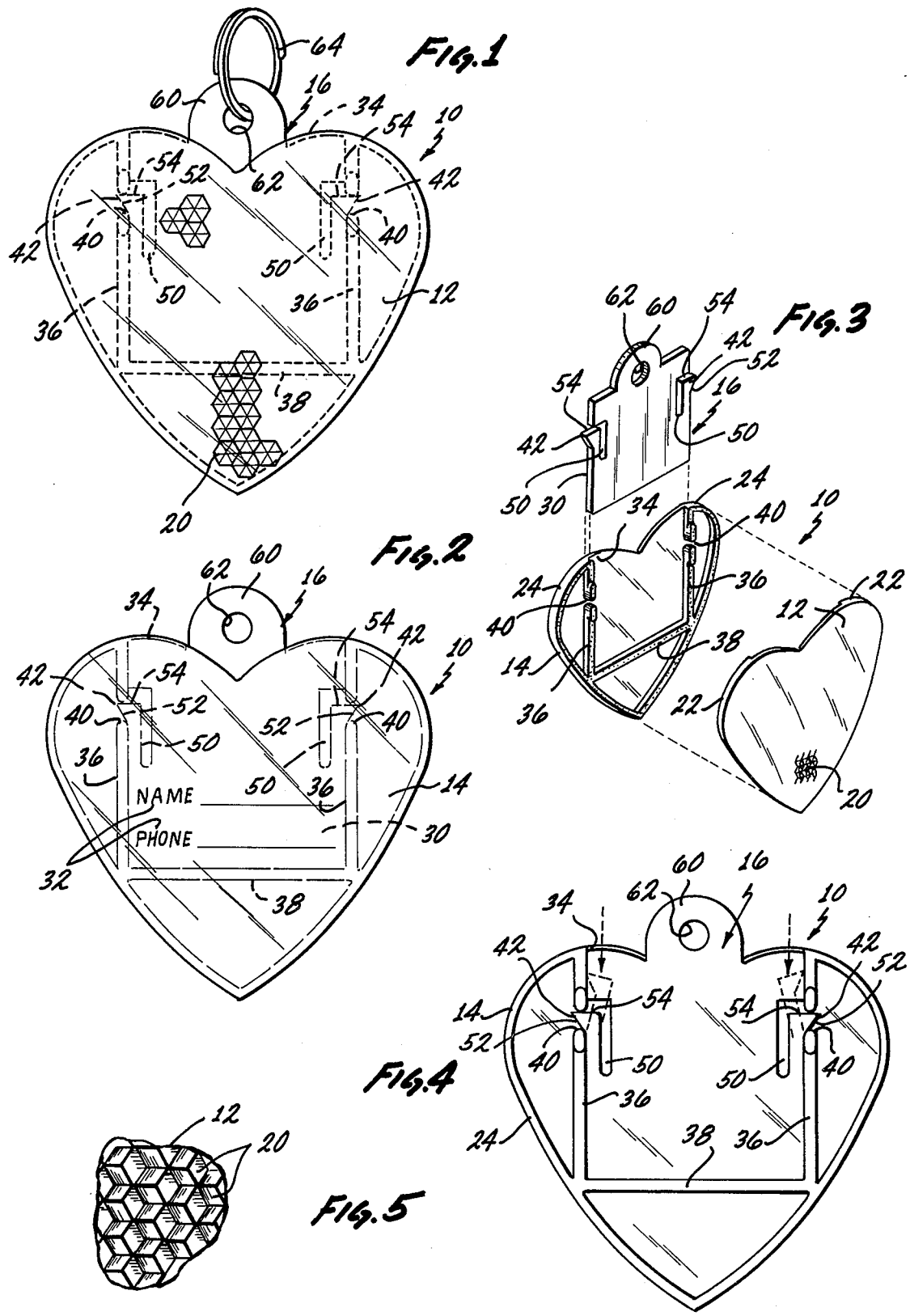

TAG

BRIEF SUMMARY OF THE INVENTION AND OBJECTIVES

My invention relates to a luminous, reflective tag with protected identification means that can be read through a transparent wall of the tag.

A preliminary examination search on the invention resulted in the searcher citing the following U.S. Pat. Nos.: 3,994,560; 3,407,523; 2,332,948; 2,196,627; 1,987,357.

None of the devices shown in these patents were familiar to me. These patents did not have much pertinency except for U.S. Pat. No. 1,987,357 to Bergen in the general art of small reflectors and more particularly the patent to Winston U.S. Pat. No. 3,407,523.

The present invention could be classified as improvement over Winston in various respects including:

(a) symbolization and design (three-dimensional heart shape, colored plastic, etc.)

(b) assembly (snap-together removable construction flanges in Winston v. sealed unit with I.D. latched against removal in present invention)

(c) all plastic construction in invention versus plastic housing and paper disc in Winston (d) differences in selections of types of molds and plastics.

The objectives of my invention include: to provide a new tag design refined in the above and other respects over what has gone before and to design a tag improved as to marketability, manufacturability, and cost.

My invention will be best understood, together with additional objectives and advantages thereof, from the following description, read with reference to the drawings, in which:

FIG. 1 is a front view of a specific embodiment of my new tag. The face being viewed is translucent and partial indication has been made of retrodirective reflector facets formed on the rear of the member being viewed (and partially showing through) to reflect light from the face of the tag.

FIG. 2 is a back view of the tag. The face, being viewed is transparent and an inscribed identification member sandwiched in the tag is visible.

FIG. 3 is a perspective view, in exploded form, of the components of the tag.

FIG. 4 is an elevational view of the inside of the rear cover member of the tag and of the identification member as if the front cover member were removed.

FIG. 5 is a fragmentary, enlarged view of a portion of the inside of the front cover member of the tag showing more detail as to retroreflectors facets.

Tag 10 has three components: a plastic front cover member 12, a plastic rear cover member 14, and a plastic identification member 16 sandwiched between members 12, 14.

Cover member 14 must be transparent material so indicia on identification member 16 can be read therethrough. Cover member 12 must be translucent and preferably is transparent (and made of the same material as member 14) so as to best act as a retroreflectors reflector (reflecting a high percentage of light back at a source of light) when its rear or inside surface is configured of retroreflectors reflecting facets 20. Members 12, 14 may be formed of a styrene or an acrylic plastic and preferably are colored red, although they may be another color or clear. Members 12, 14 are produced in steel hardened precision injection molds.

Cover members 12, 14 have mating inwardly directed marginal flanges 22, 24 respectively which are secured together with the major portions of members 12, 14 spaced forming a cavity therebetween in which identification member 16 is positioned. Flanges 22, 24 can be secured with an adhesive or by ultrasonic bonding.

Identification member 16 may be formed from an ABS acrylic. Its rear surface 30 needs to be capable of being written on with either pen or pencil and may be preprinted with legends such as those shown, which are "NAME" and "PHONE". Those legends would be particularly pertinent with a tag for a pet, so someone finding the pet will know what to call it and what number to call to notify the owner. Writing may be done on the surface 30 of the plastic itself, if properly treated, or on a paper label bonded to surface 30.

The rear surface 30 of identification member 16 or a paper label thereon dark writing with a pen, or comparably dark writing with a pencil, can be seen through the transparent rear cover 14. Member 14 being colored, inscriptions on member 16 are somewhat obscured, so the surface of identification member 16 to be written upon should be light in value and preferably near to white. The value number should be no lower than 7 in value according to the Munsell System (See *Encyclopaedia Britannica*, Volume 6, Pages 99–107, Copyright 1969).

Tag 10 preferably has a three-dimensional heart shape, i.e., having in face and back views symbolized heart shape and having a somewhat double convex outline in section, although most of the curvature is near the margins. Flanges 22, 24 are recessed at the top of the heart shape to form a slot 34 for insertion of identification member 16 therebetween. As identification member is to be inserted and latched in place and is not directly supported to holds its plane, member 16 should be rigid, meaning that it should be rigid enought for these functions.

Rear cover member 14 has a pair of parallel guiding walls 36 and a bottom wall 38 spaced to abut the edges of identification member 16 when member 16 is fully inserted through slot 34. A pair of recesses 40 in parallel walls 36 receive latches 42 on identification member 16. Walls 36 can be thickened adjacent to recesses 40 so there will be no chance of escape of detents 42.

It will be seen especially from FIGS. 3 and 4 that parallel walls 36 guide identification member 16 as it is inserted through slot 34. Detents 42 on identification member 16 can be flexed inwardly in latching because the adjacent portions of the sides of member 16 are undercut at 50. The detents 42 are cam shaped at 52 to flex inwardly as they strike parallel walls 36 but detents 42 in an opposite direction (regarding moving outwardly off recesses 40) have lateral latching surfaces 54 that will not cam relative to movement of identification member outwardly of slot 34. This means, in effect, that once identification member 16 is inserted into slot 34 far enough for detents 42 to engage in recesses 40, indentification member 16 is positively latched and will not come out. This means the name and phone 32 should be filled in on surface 30 before identification member 16 is installed in slot 34 as it is latched against removal. Wall 38 limits how far inwardly member 16 can go.

The outer portion 60 of identification member 16 has an opening 62 for securing tag 10 to an object to be tagged. For example, a ring 64 split helically can be installed in opening 62 to attach to such object.

Tag 10 can be used to identify how to reach the owner of a pet, to tag luggage or keys, and for many other purposes. Note, for example, in tagging a pet, the retroreflective facets 20 would reflect car lights on a pet at night if the pet were to have a tag 10 on his collar. The heart shape is expressive of affection for the pet as well as adding to the product by stylization. The tag can be economically produced in large quantities by injection molding of parts. The tagging function is well accomplished because it will be noted that the indicia 32 and the writing surface 30 are a part of a member 10 that is directly secured by means 64 in opening 62 to the object to be tagged, i.e., even if cover members 12, 14 were broken and lost still the tagging function would remain. When cover members 12, 14 are in place, however, the writing on surface 30 is protected so that the writing and its identification function will be protected against soiling, abrasion, exposure to the elements, etc.

Having thus described my invention, I do not wish to be understood as limiting myself for the exact construction shown and described. Instead, I wish to cover those modifications of my invention that will occur to those skilled in the art upon learning of my invention and which are within the proper scope thereof.

I claim:

1. A tag, comprising: (a) a pair of plate cover members having marginal flanges securing said cover members together and an identification member sandwiched between said cover members, one of said cover members being transparent so that material on a face of said identification member can be read therethrough, and the other cover member being formed of translucent material and having retroreflective facets to reflect light from the face thereof, (b) said identification member being formed of rigid plastic material and said face thereof being prepared so it can be written upon and said face having a value no lower than 7, according to the Munsell System, so that dark writing thereon can be read through said transparent cover member, (c) said cover members being formed of reddish material and forming together a three-dimensional heart shape and said cover members having at the top of the heart shape a slot formed therein in which said identification member is positioned with an outer portion extending outside of said heart shape having an opening therein for securing said indentification member to another object to tag the same, the dimensions of said slot being approximately the same as the cross-sectional dimensions of said identification member, and (d) said cover members having means forming parallel walls therebetween on opposite sides of said slot guiding said identification member as it is inserted in said slot, at least portions of sides of said identification member being undercut so as to be inwardly flexible and said portions of said sides being formed as latches camming inwardly as said identification member is inserted through said slot and said parallel walls having coacting latching recesses and said latches latching in said recesses against removal of said indentification member from said slot whereby said identification member is secured once it is inserted into said slot.

* * * * *